UNITED STATES PATENT OFFICE.

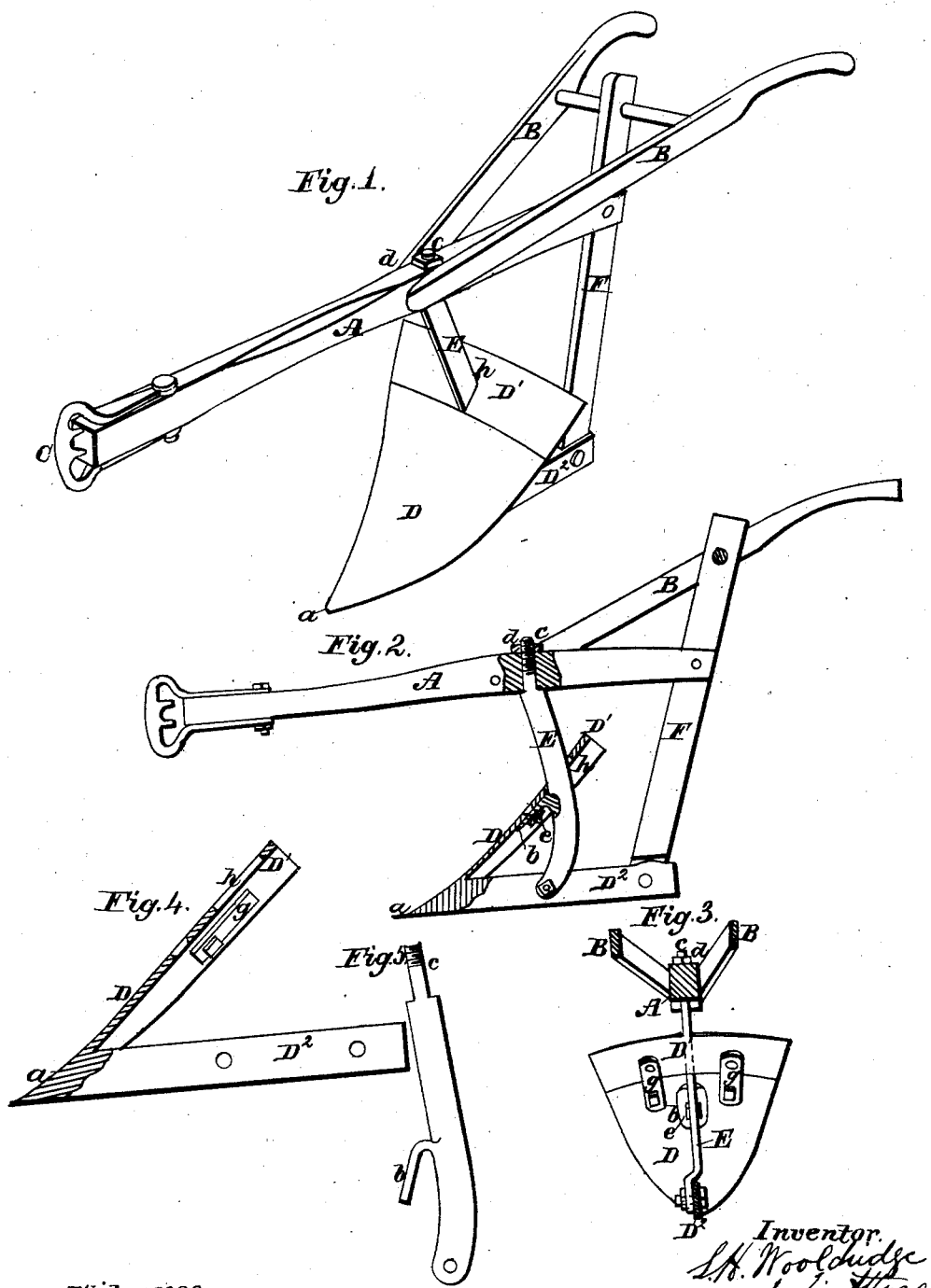

S. H. WOOLDRIDGE, OF VENICE, ILLINOIS.

IMPROVEMENT IN SHOVEL-PLOWS.

Specification forming part of Letters Patent No. 45,664, dated December 27, 1864.

*To all whom it may concern:*

Be it known that I, SILAS H. WOOLDRIDGE, of Venice, county of Madison, and State of Illinois, have invented a new and Improved Shovel-Plow; and I do hereby declare that the following is a full, clear, and exact description thereof, reference being had to the accompanying drawings, making a part of this specification, in which—

Figure 1 is a perspective view of my improved plow complete. Fig. 2 is a sectional view, showing the manner of attaching the several parts of the plow together. Fig. 3 is a sectional view, showing the rear part of the shovel. Fig. 4 is a vertical sectional view of the shovel and sole-bar. Fig. 5 is the standard, to which the main portion of the shovel is secured.

Similar letters of reference indicate corresponding parts in the several figures.

In cultivating very young plants a small shovel is desired; but when the plants become sufficiently large and strong to require hilling, then it is necessary to use a much larger shovel, which will earth-up and form ridges or hills about the roots of the plants.

The main object of my invention is to construct the shovel of a shovel-plow of two or more sections—horizontal sections—the main section forming the shovel for young crops, and the supplemental sections being so formed as to increase the height and width of the shovel for cultivating large plants, as will be hereinafter described.

To enable others skilled in the art to make and use my invention, I will describe its construction and operation.

In the accompanying drawings, A represents the plow-beam, B B the handles, and C a clevis, all of which may be constructed in the usual manner common to shovel-plows.

D represents a shovel of the usual tapering form, and D' represents the upper section or supplemental portion of the shovel. The main shovel D has a narrow bar, D², welded to its point and projecting backward therefrom, as shown in Figs. 2 and 4. This bar D² forms a part of the shovel so far as it serves to give increased thickness and strength at the point $a$, and so far as to form a sole or support behind the shovel D, by means of which the standards E F and this shovel can all be secured very rigidly to the plow-beam. The forward standard, E, is formed with a lip, $b$, on its front edge and a screw-stem, $c$, on its upper end, as shown in Figs. 2 and 5. The lower end of this standard is curved forward and securely bolted to the sole-bar D², while its upper end is passed vertically through the plow-beam A and secured thereto by means of a nut, $d$. When thus secured in its position the lip $b$ abuts against the back surface of the shovel D, and this latter is secured to the lip by means of a bolt, $e$, the head of which is countersunk into the surface of the shovel, as clearly shown in Fig. 2. The rear standard, F, is secured at its lower end to the heel of the bar D² and also to the rear end of the plow-beam, and projects above this beam a sufficient distance to serve as a support for the upper ends of the plow-handles, as shown in Figs. 1 and 2.

The upper section, D', of the shovel D has two plates, $g$ $g$, riveted to its back side, as shown in Fig. 3, which project downward and extend over the upper edge of the shovel D. This upper section, D', is now secured to the shovel by means of bolts and nuts. The slot $h$ in the center of the shovel-section D is intended to receive the standard E, so that the edges of said sections shall abut closely together and present an unbroken surface to the earth. This upper section increases the height and width of the shovel, and thus adapts the implement for use as a hilling or ridging plow. When the plow is to be used for cultivating young plants the section D' is removed by simply unscrewing the bolts which attach it to the shovel D.

Having thus described my invention, what I claim as new, and desire to secure by Letters Patent, is—

1. The construction of the forward standard, E, with a supporting lip or shoulder, $b$, formed on its forward edge, substantially as and for the purposes described.

2. The combination of the standard E, having a lip, $b$, formed on it, shovel D, having a bar, D², formed on it, and rear standard, F, with a plow-beam, A, all arranged substantially as described.

Witness my hand in matter of my application for a patent for improvement in shovel-plows.

SILAS H. WOOLDRIDGE.

Witnesses:
JOHN O. MERRITT,
AMOS ATKINS.